Feb. 16, 1965  E. P. COLALILLO  3,170,061
HEATING APPARATUS
Filed March 7, 1962
FIG. 1.
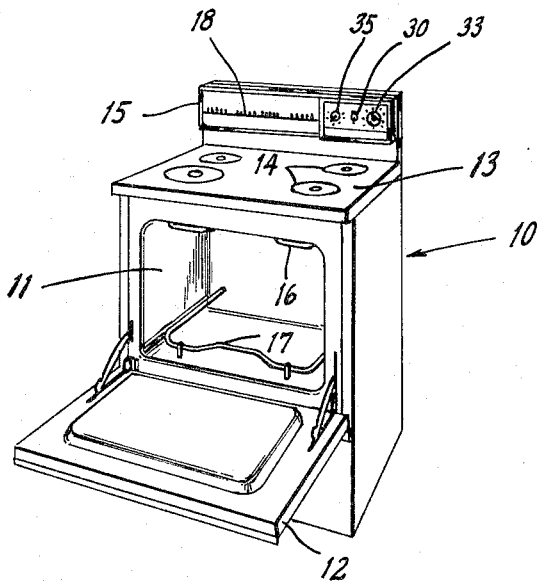
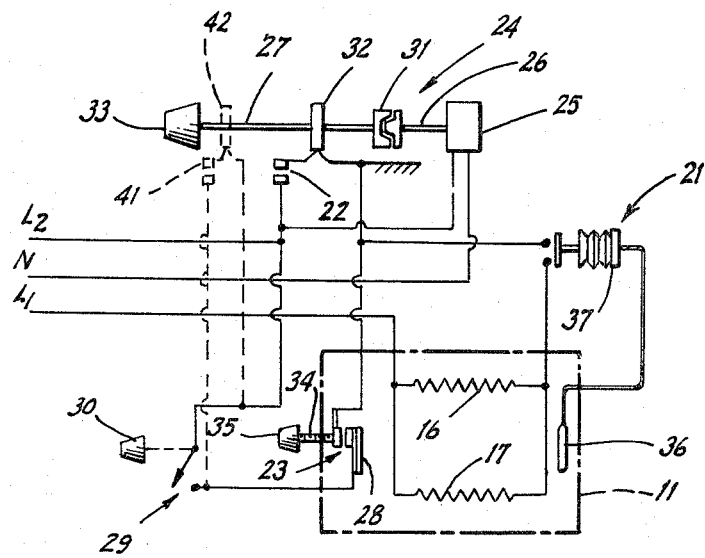
FIG. 2.
INVENTOR.
EDWARD P. COLALILLO
BY
Harry W. Hargis III
AGENT United States Patent Office 3,170,061
Patented Feb. 16, 1965

3,170,061
HEATING APPARATUS
Edward P. Colalillo, Cherry Hill, N.J., assignor to Philco Corporation, Philadelphia, Pa., a corporation of Delaware
Filed Mar. 7, 1962, Ser. No. 178,170
3 Claims. (Cl. 219—413)

This invention relates to heating apparatus, and more particularly to temperature control means for heating apparatus. While of broader applicability the invention is especially useful in cooking ranges.

In cooking ranges it has been known to provide a so-called "hold-warm" feature whereby a predetermined reduced non-cooking temperature may be maintained, following completion of a cooking period at an elevated temperature.

Accordingly, it is an object of this invention to provide simple and effective control means for achieving the above described hold-warm feature.

It is another objective of the invention to achieve simple and effective means for providing both hold-warm and preheating means in a cooking range.

In the achievement of the foregoing as well as other objectives, the invention comprises, in a preferred embodiment, the combination of a cooking chamber or oven, means for heating the oven, a timer for energizing the heating means over a predetermined period of time, first temperature control means for maintaining operation of said heating means at an elevated cooking temperature during its energization by said timer, and selectively operable control means comprising extremely simple, positive and inexpensive electrical switching means for maintaining operation of said heating means, automatically, at a reduced non-cooking temperature following deenergization of said means for heating by said timer.

The foregoing as well as additional objectives and advantages of the invention may best be understood from a consideration of the following description, taken in light of the accompanying drawing in which:

FIGURE 1 is a perspective showing of cooking range apparatus including elements of the control circuit embodying the invention; and FIGURE 2 is a diagrammatic showing of an electrical control circuit embodying the invention and including a modification shown in broken lines.

With more particular reference to the drawing, and first to FIGURE 1, the invention is, for exemplary purposes, embodied in an electric range comrpising a cabinet 10 including an oven compartment 11 and a door 12 for closing the same. The top wall 13 of cabinet 10 is provided with conventional surface units 14, and a back-splash panel 15 houses push-button controls 18 for the units. Units 14 and controls 18, while shown in the interest of a more complete understanding of preferred range structure embodying the invention, form no part of the present invention and will not be described further in the present disclosure.

In particular accordance with the invention, and first with reference also to the solid line schematic electrical circuit diagram shown in FIGURE 2, a pair of electrical resistance heating elements 16 and 17 are disposed and arranged within oven compartment 11 to heat the same. Heating elements 16 and 17 are connected in parallel electrical circuit with one another and are disposed in series electrical circuit with: a source of energy $L_1$, $L_2$, for example a 230 volt line; a thermostatically actuated switch 21; and a parallel electrical circuit including a timer actuated switch 22 in one branch, and in the other branch a bimetallic element actuated switch 23 and a manually operable single-pole single-throw switch 29 in series with the latter and operable by a knob 30.

A timer 24 includes an electric motor 25, such for example as an electric clock motor, connected in series electrical circuit with a source of energy $L_2$, N, for example a 115 volt line. A shaft 26 is driven by motor 25 and is releasably coupled to a shaft 27 by a clutch device 31. A cam 32 is mounted for rotation with shaft 27 and is disposed and adapted periodically to actuate switch 22 in accordance with preselected positions of the cam, as determined by initial positioning of the shaft by a manually operable knob 33.

The bimetallic element 28 of switch 23 is disposed for high heat exchange relation with the interior of oven 11, although it will be understood that it may be disposed in any other suitable location at which temperatures are representative of temperatures within the oven. Adjusting means for switch 23 comprises a rotatable threaded shaft 34 to which a manually actuatable knob 35 is attached. Threads on the shaft cooperate with suitable fixed nut means (not shown) to provide axial movements of the shaft to position the adjustable contact. Shaft 34 is rotatable by knob 35, and modifying the spacing between the contacts of switch 23, by rotating the shaft, modifies the temperature range in which the switch operates.

Switch 21 is actuatable by a conventional refrigerant filled bellows 37 connected in fluid flow communication with bulb means 36 disposed and adapted to sense temperatures within the oven. While, in the illustrated embodiment, thermostatic switch 21 is adapted to operate over a fixed temperature range, it will be understood that it may also be provided with means for varying the temperature range in accordance with known practice.

As respects the relative operating ranges of thermostatic switches 21 and 23, and in accordance with principles of the invention, the operating ranges of switch 23 are below, and outside, the operating range of main switch 21. For example, switch 21 in a preferred setting may be adapted to open at 350° F. and to close at 300° F., whereby to maintain a nominal cooking temperature of 325° F. within the oven. Switch 23, in a preferred setting may be adapted to open at 145° F. and to close at 135° F., whereby to maintain a nominal non-cooking or hold-warm temperature of 140° F. within the oven.

In the operation of representative apparatus embodying the invention, it will be first assumed that a timed cooking period is to be initiated at once, immediately to be followed by a hold-warm period. To provide for the hold-warm period immediately following the cooking period, switch 29 is closed by rotating knob 30, whereby switch 23 is placed in electrical shunt circuit with switch 22. Heaters 16 and 17 are then energized independently of the timer by moving knob 33 and shaft 27 to the left as viewed in FIGURE 2, to disengage shaft 27 from timer motor shaft 26, which disengagement is provided by clutch means 31. Knob 33 is then rotated to cause came 32 to close switch 22, thereby energizing the heaters through $L_1$, $L_2$, since, initially, switch 21 is closed. Thereafter, knob 33 and shaft 27 are moved manually, to the right to engage, via clutch means 31, shaft 27 with timer shaft 26, thereafter to provide a timed cooking period.

Initially, therefore, switches 21, 22, 23 and 29 are closed, and as the oven is heated toward cooking temperature, switch 23 will open and remain opened while the oven heaters are alternately energized and deenergized by switch 21 to control the cooking function.

After a predetermined cooking period under the control of thermostatic switch 21, the timer will have rotated cam 32 to open switch 22. With both switches 22 and 23 open, oven 11 will cool, in the absence of heater energization, until such time as the cut-in temperature of switch 23 is reached. At such time the oven heaters 16 and 17 will be sequentially energized and deenergized to provide the lower, or hold-warm temperature of 140° F. As will now be understood heater energization for the cooking period is provided by $L_1$, $L_2$ through the series electrical circuit connected therewith and comprising closed contacts of switch 22 and thermostatic switch 21. After switch 22 has opened, and the oven has cooled sufficiently to close thermostatic switch 21, the heaters are alternately energized and deenergized, in provision of the hold warm period, through the series electrical circuit connected therewith and comprising $L_1$, $L_2$, closed switch 29, thermostatic switch 23, and closed thermostatic switch 21.

It will be understood that a variety of hold-warm temperatures are available due to the adjustability of switch 23. The nominal 140° F. temperature disclosed by way of example has been found desirable in that it is a combined good-serving, non-cooking, and substantially spoilage-free temperature for a number of foods.

In another operating sequence available to the user, a preheating period may be obtained prior to the cooking period first by turning knob 30 to close switch 29 and setting the timer 24 by its knob 33 to provide a later-initiated cooking period, which latter period is again achieved by closing switch 22. In setting the controls to provide preheating followed by cooking, a heater-energizing circuit first is provided from $L_1$, $L_2$ through switch 29, the controlling thermostatic switch 23, and closed thermostatic switch 21, since switch 22 is open. At the end of the preheat period, which coincides with initiation of the cooking period, switch 22 is closed by the timer whereby switches 29 and 23 are shunted out of the circuit and the heaters thereafter cyclically deenergized and energized through thermostatic switch 21. A preheating period may, for example, be desirable in the event food to be baked or roasted is in a frozen condition at the time it is placed in the oven. Under such a condition it is frequently desirable to thaw the food prior to cooking.

Still another operating sequence may be provided, in accordance with a switch modification shown in broken lines in FIGURE 2, in which sequence no preheating period is provided and a hold-warm period automatically follows a cooking period to be later initiated. In the modification, a switch 41 has its contacts disposed in parallel electrical circuit with or across contacts of switch 29 and is adapted for actuation by a cam 42 carried by shaft 27. By virtue of this arrangement, switch 41 takes the place of switch 29. Cam 42 may be so shaped as to close the contacts of switch 41 automatically either upon initiation of the cooking period when switch 22 is closed by cam 32, or upon completion of the cooking period when switch 22 is opened by cam 32. In either event, the closure of switch 22 overrides, by shorting, any position of either of switches 29 and 41. In the modified form, preheating is still available to the user by means of manually actuatable switch 29.

It will therefore be appreciated that the invention provides simple and effective control means for obtaining selectively actuatable hold-warm and preheating means in a cooking range through a novel timer and thermostatic control arrangement requiring a minimum of mechanical linkages.

While a preferred embodiment of the invention has been illustrated, it will be understood that such modifications are contemplated as fall within the scope of the appended claims.

I claim:

1. In cooking range apparatus, the combination of a cooking chamber, heating means for the latter, and means for controlling energization of said heating means to obtain a higher and a lower average temperature period in the cooking chamber, said last recited means comprising: a timer-actuated switch and a first thermostatic switch connected in series electrical circuit with one another and controlling energization of said heating means, said first thermostatic switch having opening and closing temperatures providing for said higher average temperature in said cooking chamber when said timer actuated switch is closed; a second thermostatic switch connected in parallel electrical circuit with said timer actuated switch and having opening and closing temperatures below both the opening and closing temperatures of said first thermostatic switch and providing for said lower average temperature in said cooking chamber when said timer-actuated switch is opened; and a selectively actuatable switch disposed in series electrical circuit with said second thermostatic switch and in parallel electrical circuit with said timer actuated switch.

2. The combination according to claim 1 and further including a second timer-actuated switch disposed in parallel electrical circuit solely with said selectively actuatable switch, said second switch being also selectively actuatable to close while said timer-actuated switch in either opened or closed.

3. The combination according to claim 1 and further including a second timer-actuated switch disposed in series electrical circuit with said second thermostatic switch, in parallel electric circuit with said timer actuated switch, and actuatable either to open or to close while said timer actuated switch is open.

References Cited in the file of this patent
UNITED STATES PATENTS

| | | |
|---|---|---|
| 1,946,842 | Dillman | Feb. 13, 1934 |
| 3,032,636 | Schauer | May 1, 1962 |